Dec. 5, 1961 W. W. BELL 3,011,476
REWARD DISPENSING APPARATUS
Filed Oct. 21, 1958 2 Sheets-Sheet 1
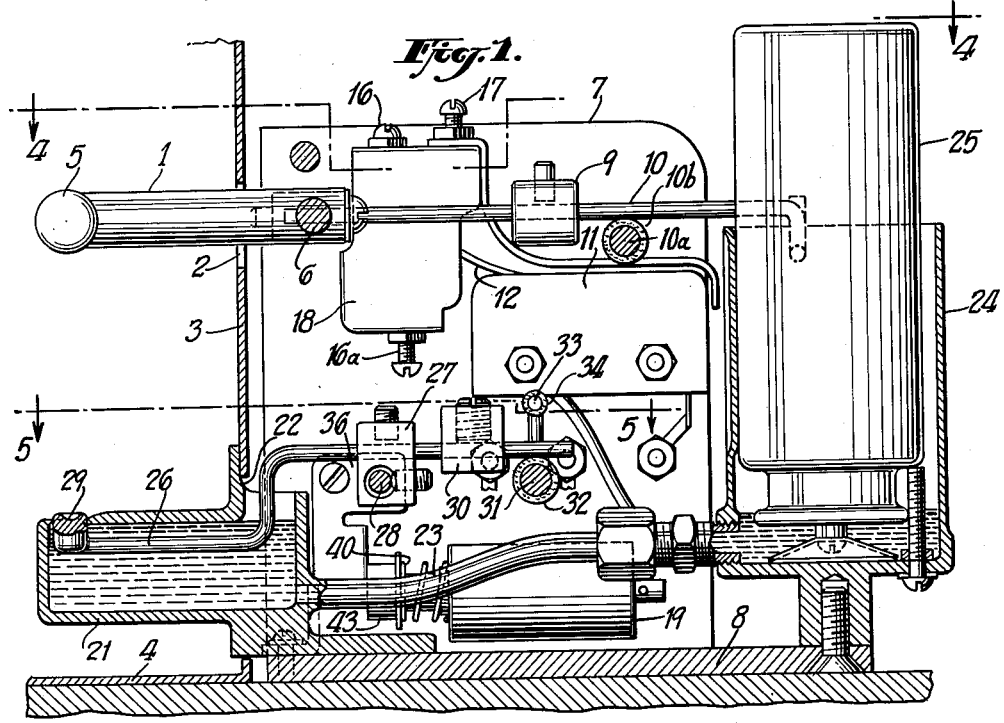
INVENTOR.
WILLIAM W. BELL.
BY
Ward, Neal, Haselton, Orme & McElhannon
ATTORNEYS Dec. 5, 1961 W. W. BELL 3,011,476
REWARD DISPENSING APPARATUS
Filed Oct. 21, 1958 2 Sheets-Sheet 2
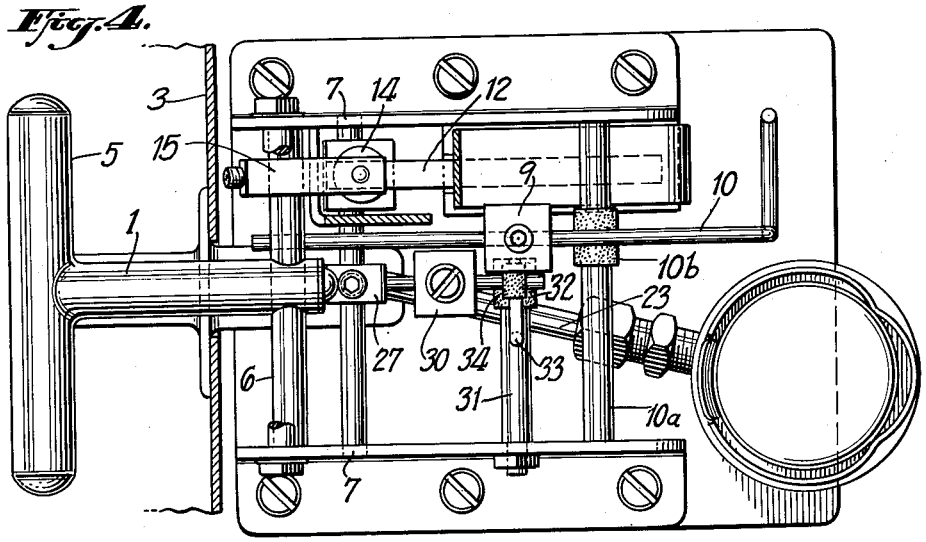
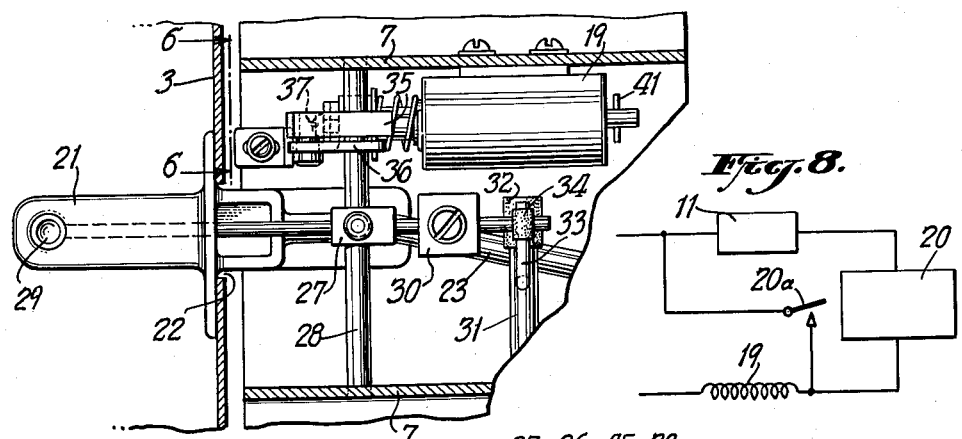
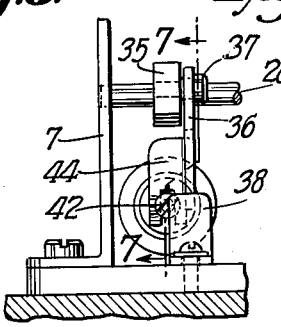
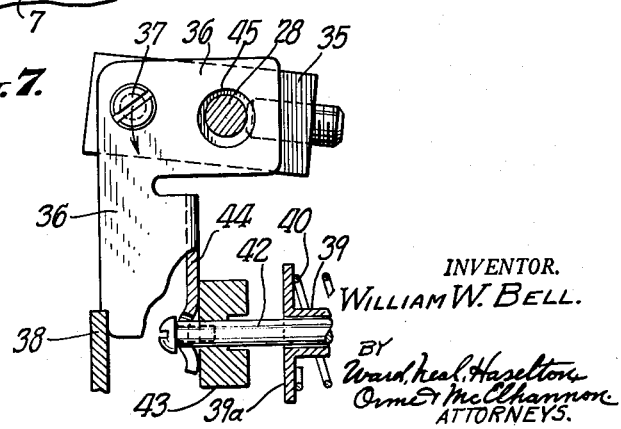
INVENTOR.
WILLIAM W. BELL.
BY Ward, Neal, Haselton,
Orme & McClannon
ATTORNEYS.

3,011,476
REWARD DISPENSING APPARATUS
William W. Bell, 201 Serpentine Road, Tenafly, N.J.
Filed Oct. 21, 1958, Ser. No. 768,632
1 Claim. (Cl. 119—29)

In studying animal behavior under the influence of different drugs or other attendant factors affecting the animal, animals such as white rats may be placed in a cage containing a treadle or the like which the animal can readily actuate, the treadle being used in combination with a dispensing mechanism which feeds into the cage an appropriate "reward"—for example an edible pellet or a small supply of potable liquid, whenever the animal actuates the treadle in compliance with pre-set operating conditions. For example the reward dispensing mechanism may be arranged to operate after the animal has actuated the treadle a predetermined number of times, or when after obtaining a reward the animal again actuates the treadle when a prescribed period of time has elapsed.

The present invention relates to a reward dispensing apparatus having structural and operational features intended especially to meet the operating requirements for laboratory studies of the above character. In one of its aspects the invention aims to provide apparatus of the above character wherein prolonged depression of the treadle by the animal will not modify the mode of operation i.e. the response of the apparatus to depression of the treadle by the animal will be the same regardless of whether the treadle is merely depressed for an instant, or held by the animal in depressed position for a longer period. In another aspect the invention aims to provide such an apparatus wherein the reward dispensing mechanism will be automatically locked in inactive position after each dispensing step, to prevent the animal from rewarding itself, so to speak, by securing repetition of the reward securing step without first repeating the sequence of treadle depressing operations for which the apparatus is set up, by way of conditions precedent to securing a reward. In another aspect the invention includes special features by which a single substantially instantaneous response of the apparatus to depression of the treadle and/or to fulfillment of the sequence of treadle depressions necessary to secure a reward, will be secured regardless of the time during which the treadle is held depressed, or during which compliance with the reward producing sequence of treadle depressions is maintained. This latter feature is particularly advantageous where the apparatus is electromagnetically actuated, in that excessive power consumption and overheating of the electromagnets during prolonged depression of the treadle is thereby avoided. Further objects and advantages of the invention will be in part obvious and in part specifically referred to in the description hereinafter contained which, taken in conjunction with the accompanying drawings, discloses a preferred form of apparatus constructed to operate in accordance with the invention. The disclosure however should be considered as illustrative of the invention in its broader aspects. In the drawings FIG. 1 is a side view partly in section of an apparatus constructed to operate in accordance with the invention FIG. 2 is a section taken through the apparatus in a place parallel to FIG. 1

FIG. 3 is a detail sectional view showing certain parts of the apparatus which appear in the upper left hand portion of FIG. 2

FIGS. 4 and 5 are horizontal sectional views taken respectively on the broken lines 4—4 and 5—5 of FIG. 1, looking in the direction of the arrows FIG. 6 is a detail section on the line 6—6 of FIG. 5, looking in the direction of the arrows FIG. 7 is an enlarged detail section taken on the broken line 7—7 of FIG. 6, looking in the direction of the arrows FIG. 8 is a simplified circuit diagram showing schematically the coordination of the main operating parts of the apparatus.

In the illustrated embodiment of the invention the depressible treadle which is actuated by the animal under test, takes the form of a lever 1 which may be understood as projecting through an opening 2 (FIG. 1) in the side wall 3 of an appropriate cage for confining the animal, the bottom wall 4 of said cage being also indicated in FIG. 1. The treadle 1 may be understood as having a crosspiece 5 conveniently located in the cage for depression by the weight of the animal, and is shown as fixedly carried by a rock shaft 6 which is journaled in opposite side frames 7 of the apparatus, the side frames being shown as mounted upon a suitable base member 8. The treadle 1 is appropriately urged toward its upper idle position shown in FIG. 1, for example by a counterweight 9 (FIG. 1) adjustably mounted upon a rod 10 carried by the shaft 6. A stud 10a extending between the side walls 7 serves as a stop upon which the rod 10 rests when the treadle is in its idle, upper position, this stop being preferably insulated from the rod 10 as indicated at 10b for purposes later to be referred to.

The treadle 1 controls the position of the circuit closer indicated generally at 11 in FIG. 1, the circuit closer in turn controlling the operation of the reward dispensing mechanism as hereinafter referred to, in such manner that the delivery of a reward to the interior of the cage previously mentioned is normally dependent upon depression of treadle 1 by the animal under test. As previously mentioned the arrangement is such that no matter how long the treadle 1 is held in depressed position by the animal, the circuit closer 11 will be held in closed position only for a short period of time sufficient to enable actuation of the reward dispensing mechanism to be secured if desired. Preferably the circuit closer 11 is in the form of a microswitch, which may be of form well known in the art and having an actuating member 12 in the form of a lever which is appropriately urged toward a position in which the microswitch is open.

Depression of the treadle 1 causes the switch actuating member 12 to move the switch to closed position, and in the preferred form of the invention the motion transmitting means or parts interposed between the treadle and the actuating member 12 include magnetically coupled parts so arranged that upon partial movement of the treadle toward fully depressed position, the magnetic coupling causes member 12 to move to circuit closing position, and thereafter as movement of the treadle continues toward fully depressed position, the magnetic coupling is released to free the actuating member 12 for movement back to its open circuit position. Accordingly the circuit closer or switch 11 will be closed for a short interval as the treadle moves toward fully depressed position, but will move back to open position before depression of the treadle is completed, and the circuit closer will thereupon remain open no matter how long the treadle is held in fully depressed position.

In the illustrated form of the invention the magnetic coupling above referred to comprises a magnetic piece 13 (FIG. 2) carried by the circuit closer actuating member 12, and a cooperating magnetic piece 14 carried by an arm 15 fixed to the shaft 6. A stop member 16 (FIG. 2) determines the fully depressed position of treadle 1 by engagement with the arm 15 as shaft 6 is rocked, and a further stop member 17 (FIG. 2) engages actuating member 12 when circuit closer 11 reaches closed position. Thus as the parts move from the idle, open circuit position shown in FIG. 2, the magnetic coupling between the elements 13 and 14 will cause the actuating member 12 to move to circuit closing position by the time the treadle 1 reaches partially depressed position, but as the treadle moves further to fully depressed position, the magnetic coupling between elements 13 and 14 will be broken as the treadle moves into its fully depressed position as determined by the setting of stop 16. When the magnetic coupling is broken, the actuating member 12 being so biased, will move back to its open circuit position shown in FIG. 3 as determined by the stop 16a, and remain there regardless of the time during which the treadle is held in fully depressed position. This condition is shown in FIG. 3, and when the animal releases the treadle the latter being so biased, moves back to the position shown in FIG. 2, the circuit closer 11 remaining open until the animal again depresses the treadle. The above mentioned stop members 16, 16a and 17 are shown as carried by an appropriate housing 18 (FIGS. 2–4) attached to one of the side frames 7.

FIG. 8 shows schematically, the circuit closer 11 in circuit with a solenoid 19 which should be understood as the operating element of the reward dispensing mechanism used in the apparatus. If circuit to the solenoid 19 were controlled solely by circuit closer 11, a reward would be dispensed each time the treadle is depressed, but an auxiliary circuit controller 20 will usually be employed which may be adjusted so that the solenoid 19 will be energized only after a predetermined sequence of treadle depressing steps has occurred. The circuit controller 20 may be for example in the nature of a time switch which is adjustable to close circuit only after different predetermined time intervals have elapsed, or in the nature of a counter-switch adjustable to close circuit only after a predetermined number of depressions of the treadle have occurred. Appropriate circuit controllers of the above character are known in the art, and will not be described in detail. As indicated in FIG. 8, a manually operable circuit closer 20a may also be used to cause a reward to be dispensed whenever desired by the conductor of the tests.

In the disclosed embodiment of the invention the reward dispensing mechanism is in the form of a liquid feeder which renders accessible in the cage above referred to, a small amount of potable liquid whenever the solenoid 19 is energized. As shown, this liquid feeder is provided with a well 21 which protrudes from the apparatus through an opening 22 in the side wall 3 into the interior of the cage above referred to. This well is supplied with liquid at constant level through a tube 23 communicating with an appropriate liquid supply reservoir 24 which need not be described in detail, but which is shown as receiving an inverted bottle 25.

An arm 26 (FIG. 1) is shown as carried by a block 27 fixed to a rock shaft 28 journaled in the side walls 7 previously referred to. The forward end of this arm 26 is shown as provided with a cup 29 which dips into the liquid contained in a well 21 whenever the arm 26 rocks counterclockwise from the position in FIG. 1. The arm 26 is appropriately urged toward the position shown in FIG. 1, for example by a counterweight 30 adjustably carried by the rear end portion of the arm. When in dispensing position the arm 26 rests against an appropriate stop as indicated by the stud 31 (FIG. 1), for purposes hereinafter referred to. A stop 33, insulated as indicated at 34 (FIG. 1) limits the extent of the counterclockwise movement of arm 26 which takes place when cup 29 is immersed in the liquid contained in well 21. Thus as the arm 26 is rocked between the positions above referred to, the cup 29 is lowered to receive a fresh supply of liquid, which supply is rendered accessible within the cage when the arm 26 is restored to the dispensing position shown in FIG. 1.

Preferably a dispenser arm 26 is releasably locked in dispensing position and actuated by the solenoid 19 through a magnetic coupling which releases the lock and actuates the dispenser immediately when the solenoid is energized, the magnetic coupling being broken when the dispenser arm 26 has moved to liquid receiving position, and the arm 26 being thereupon moved back to dispensing position and locked in such position until the solenoid 19 is again energized.

In the illustrated form of the invention the dispensing arm 26 is actuated through a train of parts including the arm 35 fixed to the shaft 28 and carrying a lock member 36 which is pivoted thereto by a pin 37. In the positions shown in FIGS. 2 and 7 the lock member 36 seats against a post 38 extending up from the base 8, and holds the shaft 28 against rocking so that the dispensing arm is locked in dispensing position.

The solenoid 19 is provided with a core 39 (FIG. 2) which is urged by spring 40 toward the open circuit position shown in FIG. 2, a stop pin 41 being preferably provided at the end of the core which appears at the right in FIG. 2, to limit the position to which the core may be urged by spring 39. A headed pin 42 (FIG. 7) is slidably received in the core 39 and has fixed thereto a magnetic block 43. The lock member 36 is provided with a forked extension 44 which engages between the head of pin 42 and the magnetized block 43. As soon as solenoid 19 is energized, the magnetic coupling provided by the part 44 and a flange 39a on core 39, first swings the lock member 36 about pin 37 to the right from the position shown in FIG. 7, thus releasing the lock from post 38. The lock member 36 has a hole 45 (FIG. 7) therethrough which loosely surrounds the shaft 28, and as soon as the parts have moved sufficiently from the position shown in FIG. 2 to release the lock, the lock member 36 moves into engagement with shaft 28 to prevent further pivotal movement of lock 36 about pin 37, whereupon further movement of the core 39 into solenoid 19 rocks the shaft 28 to immerse cup 29 of dispenser arm 26 down into the liquid contained in well 21, until the arm engages the stop 33. Further movement of the core 39 into solenoid 19 thereupon breaks the magnetic coupling between the block 43 and the flange 39a on core 39 as shown in FIG. 7. The counterweight 30 thereupon rocks the arm 26 back to dispensing positions, reseating the lock member 36 against the post 38 to lock the dispenser against reactuation irrespective of the time current continues through solenoid 19. When solenoid 19 is de-energized, the spring 40 restores the magnetic coupling between the block 43 and flange 39, the parts being then in the position shown in FIG. 2. FIG. 7 shows the parts at a phase in which the dispenser arm has been locked in dispensing position, but the solenoid 19 is still energized so that the magnetic coupling is broken.

When a reward-producing actuation of treadle 1 occurs (the auxiliary circuit controller 20 being then in closed circuit position) the circuit closer 11, as above described, maintains a closed circuit to solenoid 19 only for an instant no matter how long the treadle 1 is held depressed. This is very important in avoiding overheating of solenoid 19 and in reducing power consumption. The locking device used in connection with the dispensing mechanism prevents self-rewarding so to speak by the animal, and prevents reactuation of such mechanism even though current through solenoid 19 be maintained for a longer period. The apparatus involves only a minimum of simple parts projecting into the cage in which the animal is confined, and which are not readily deranted or actuated in abnormal manner by the animal.

While the invention has been disclosed as carried out by the above described specific form of apparatus, it should be understood that changes may be made therein without departing from the invention in its broader aspects, within the scope of the appended claim.

I claim:

Reward dispensing apparatus of the character described including a supporting frame, a reward dispensing arm projecting from said frame into position to be received within a cage, a rock shaft mounting said arm for movement between reward receiving and reward dispensing positions, an electromagnet for actuating said reward dispensing arm, a circuit closer controlling said electromagnet, and motion transmitting means interposed between said rock shaft and electromagnet, said means including a locking member pivotally mounted with respect to said rock shaft and normally holding said reward dispensing member in dispensing position, and magnetically coupled parts interposed between said locking member and said electromagnet, said parts operating to move said locking member from locking position upon energization of said electromagnet by said circuit closer, and further operating upon continuance of said energization to further move said locking member to rock said shaft and thereby move said dispensing member to reward receiving position, a stop member positioned to break said magnetic coupling after said reward dispensing member has moved to reward receiving position, and means urging said reward dispensing member toward reward dispensing position to thereby move the same to such position and move said locking member to locking position, after said magnetic coupling has been broken as aforesaid.

References Cited in the file of this patent
UNITED STATES PATENTS

| | | |
|---|---|---|
| 2,006,690 | Blake | July 2, 1935 |
| 2,796,044 | Breland | June 18, 1957 |
| 2,796,045 | Breland | June 18, 1957 |